US008365903B2

(12) United States Patent
Schmidt et al.

(10) Patent No.: US 8,365,903 B2
(45) Date of Patent: Feb. 5, 2013

(54) ROLLER DRIVE AND SYSTEM OF ROLLER DRIVES

(75) Inventors: Josef Schmidt, Graben-Neudorf (DE);
Günter Becker, Östringen (DE);
Thomas Leichter, Karlsruhe (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 144 days.

(21) Appl. No.: 13/061,460

(22) PCT Filed: Aug. 8, 2009

(86) PCT No.: PCT/EP2009/005771
§ 371 (c)(1),
(2), (4) Date: Feb. 28, 2011

(87) PCT Pub. No.: WO2010/025806
PCT Pub. Date: Mar. 11, 2010

(65) Prior Publication Data
US 2011/0155539 A1    Jun. 30, 2011

(30) Foreign Application Priority Data

Aug. 27, 2008 (DE) .................. 10 2008 039 837

(51) Int. Cl.
*B65G 13/06* (2006.01)
(52) U.S. Cl. ..................... 198/788; 198/789
(58) Field of Classification Search .............. 198/788, 198/789
See application file for complete search history.

(56) References Cited

U.S. PATENT DOCUMENTS

| | | | | |
|---|---|---|---|---|
| 5,452,790 | A * | 9/1995 | Morrell et al. | 198/782 |
| 5,462,156 | A * | 10/1995 | Kobayashi et al. | 198/788 |
| 5,918,728 | A * | 7/1999 | Syverson | 198/788 |
| 6,244,427 | B1 | 6/2001 | Syverson | |
| 6,571,933 | B1 | 6/2003 | Gortz et al. | |
| 6,672,449 | B2 | 1/2004 | Nakamura et al. | |
| 6,854,592 | B2 * | 2/2005 | Fukuoka | 198/788 |
| 2001/0027909 | A1 * | 10/2001 | Itoh et al. | 198/788 |
| 2004/0108189 | A1 | 6/2004 | Itoh et al. | |

FOREIGN PATENT DOCUMENTS

| | | |
|---|---|---|
| DE | 699 16 645 | 4/2005 |
| EP | 1 209 101 | 5/2002 |

OTHER PUBLICATIONS

International Search Report, issued in corresponding International Application No. PCT/EP2009/005771.
International Preliminary Report on Patentability, issued in corresponding International Application No. PCT/EP2009/005771.
Written Opinion, issued in corresponding International Application No. PCT/EP2009/005771.

* cited by examiner

*Primary Examiner* — James R Bidwell
(74) *Attorney, Agent, or Firm* — Kenyon & Kenyon LLP

(57) ABSTRACT

A roller drive and system of roller drives, which includes a roller component driven by an electric motor, the electric motor being supplied from an electronic circuit, which is connected to a secondary coil, which is inductively coupled to a primary conductor installed in the external environment of the roller component, the electric motor, the electronic circuit, and the secondary coil being at least partially surrounded by the roller component so as to form a housing.

18 Claims, 1 Drawing Sheet

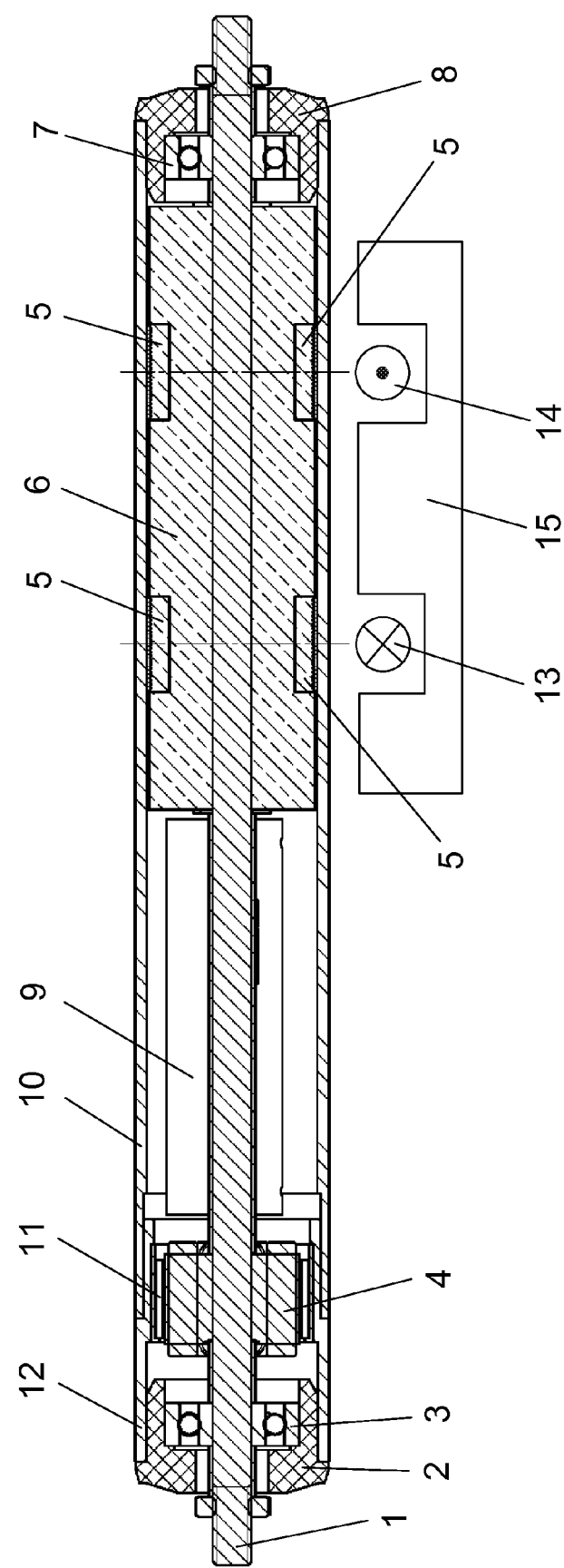

ROLLER DRIVE AND SYSTEM OF ROLLER DRIVES

FIELD OF THE INVENTION

The present invention relates to a roller drive and a system of roller drives.

SUMMARY

The present invention is based on simplifying the structure and operation, especially also the servicing, of a conveyor system.

Among features of example embodiments of the present invention in the roller drive are that, including a roller component driven by an electric motor, the electric motor being supplied from an electronic circuit, which is connected to a secondary coil, which is inductively coupled to a primary conductor installed in the external environment of the roller component, the electric motor, the electronic circuit, and the secondary coil being at least partially surrounded by the roller component so as to form a housing.

In this context it is advantageous that a galvanic separation is provided between the roller drive and the environment. In particular, the electronic circuit and the electric motor are galvanically separated from the environment.

Another advantage is that it is possible to supply a plurality of roller drives from a single primary conductor without the need to actuate a plug and socket connection. That is to say, only the primary conductor is installed within the system and the roller drives are placed accordingly. Thus, all roller drives are able to be supplied in inductive manner. Another advantage in this context is that the current in the primary conductor is able to be controlled or regulated centrally. Thus, the drive power of the roller drives is controllable centrally. This is advantageous especially in a conveyor device in which the roller drives are disposed one after the other and in this manner attain the same and/or a similarly reduced conveyor speed. It is even possible to save data transmission devices in such a system. If data transmission devices are provided, then the conveyor speed is adjustable very precisely.

In addition, the roller drive is supplied in a simple manner, without wear, and centrally supplyable, and thus also centrally controllable, which simplifies servicing, the operation and the installation.

A shared housing may be formed for the electric motor, the electronic circuit and the secondary coil, which housing encompasses at least the roller component which is simultaneously utilized for driving the conveyor goods.

In example embodiments, the housing is made up of the roller component and additional housing components connected to it, at least one of these housing components accommodating a bearing. In this context it is advantageous that the roller component is able to be produced as thin-walled pipe and the housing components accommodating a bearing are able to be processed by cutting.

In example embodiments, the stator is connected to a stationary axle or shaft of the roller drive. This provides the advantage that the electrical supply is stationary, which means that the electronic circuit feeding the stator may likewise be fixed in place.

In example embodiments, the rotor is firmly connected to the roller component. This is advantageous insofar as the rotor may be provided with permanent magnets, so that the drive forces are transmittable directly to the rotor and to the components connected to it, such as the roller component, for instance.

In example embodiments, the roller component is disposed between the secondary winding and the primary conductor. In this context it is advantageous that the inductive supply of the drive is implementable through its housing component, especially through a rotating housing component.

In example embodiments, the secondary winding is provided around a ferrite core, which is implemented in an E-shape in the direction of the primary conductor. This is advantageous insofar as it allows the magnetic field lines that run between the conductor and the return conductor to be conducted largely through the center limb of the ferrite core, so that high efficiency is obtainable.

In example embodiments, the distance between roller drive and primary conductor is adjustable by axial displacement of the roller drive, especially by providing the roller drive with a conical housing section. In this context it is advantageous that the distance is adjustable very precisely and thus even a small distance is realizable. Furthermore, there is no substantial change in distance when a massive conveyor item arrives, since this item, at most, causes the roller component to sag, so to speak, i.e., causes a deflection of the roller component in the gravitational direction. When installing the primary conductor in the axial edge region, i.e., in close proximity to the bearings, sagging is irrelevant and, depending on the selected angle of the cone, does not have any effect in connection with a change in distance.

In example embodiments, the roller component is made of plastic. This has the advantage that high efficiency is realizable in the inductive supply, especially because no eddy currents are created.

In example embodiments, the electronic circuit is connected to a sensor, in particular to a sensor coil winding, in particular for the purpose of detecting the arrival of a metallic part in the sensitivity range of the sensor. This has the advantage that the drive is able to be activated only when an item to be conveyed arrives. Energy is able to be saved in this manner.

In example embodiments, the primary conductors, especially a supply conductor and a return conductor of a conductor loop, are situated perpendicular to the axle or shaft of the roller drive. This offers the advantage of dispensing with a connection terminal for the electrical supply of the roller drive.

In example embodiments, a medium-frequency current, especially one having a frequency between 10 and 500 kHz, is injected into the primary conductor, a capacitance being connected to the secondary winding in series or in parallel such that the associated resonant frequency substantially corresponds to the frequency of the current in the primary conductor. This offers the advantage of achieving high efficiency, which substantially is variable only slightly, even if the distance changes.

In example embodiments, a higher-frequency current component, modulated upon the current in the primary conductor and/or in the secondary winding, is provided for the data transmission. This is advantageous insofar as no additional data transmission devices are required.

In example embodiments, the rotor of the electric motor drives an input shaft of a gear, whose output shaft drives the roller component. In this context it is advantageous that a higher rotational speed or a lower rotational speed or a corresponding torque is able to be provided for the conveyor goods.

In example embodiments, a magnetic shield, such as an aluminum component or the like, is provided on the side of the ferrite core facing away from the primary conductors, around which the secondary winding is wound. This has the advantage that metallic conveyor goods are able to be conveyed without essential eddy current losses in the metallic conveyor goods.

Among features of the system of roller drives are that they are supplied inductively from a primary conductor system, the roller drives are disposed one after the other along the primary conductor system, an alternating current, especially one having a frequency between 10 and 500 kHz, is injected by a power supply, the drive power, rotational speed and/or torque of each roller drive being controlled or regulated by the power supply in the same manner, i.e., especially by current stipulation in the primary conductor system.

In this context it is advantageous that a single central unit, such as a power supply, suffices for controlling or regulating the power data of the respective roller drives.

Further features and aspects of example embodiments of the present invention are described in more detail below with reference to the appended Figures.

LIST OF REFERENCE NUMERALS 1 shaft
2 housing component
3 bearing
4 stator winding including laminated core
5 secondary winding
6 ferrite core
7 bearing
8 housing component
9 electronic circuit
10 roller component
11 permanent magnets
12 motor housing component
13 supply conductor
14 return conductor
15 ferrite core

BRIEF DESCRIPTION OF THE DRAWINGS

FIG. 1 is a cross-sectional view of a roller drive according to an example embodiment of the present invention.

DETAILED DESCRIPTION

A roller drive according to an example embodiment of the present invention is shown in FIG. 1 in a sectional view.

A shaft 1 is disposed in stationary manner, that is to say, fixedly or detachably connected to an adjacent system component. The housing of the roller drive is rotationally mounted. Toward this end, a bearing 3 is provided by which a housing component 2 is rotationally mounted on stationary shaft 1, the outer ring of bearing 3 being accommodated in housing component 2, and shaft 1 being routed through the inner ring of bearing 3. A motor housing component 12 is slipped onto housing component 2, and joined.

Stator winding 4 together with the laminated core of an electric motor is fixedly or detachably connected to shaft 1, likewise in stationary manner. The electric motor also includes permanent magnets 11, which are fixed in place on motor housing component 12, especially bonded.

Roller component 10 is slipped over housing component 2 and connected, the roller component being joined at its other axial terminal region to a housing component 8 mounted on stationary shaft 1 via a bearing 7.

Thus, given suitable energization of the stator winding, the housing components (2, 12, 8) are able to be set into rotary motion.

In addition, an electronic circuit 9, which supplies stator winding 4 of the electric motor, is connected to shaft 1. With the aid of a secondary winding 5, electronic circuit 9 is supplied in contactless manner from primary conductors, into which a medium frequency alternating current is injected, especially a current having a frequency between 10 and 500 kHz. Secondary winding 5 is disposed in stationary manner, similar to electronic circuit 9, i.e., connected to shaft 1. Secondary winding 5 is wound around a ferrite core 6.

The primary conductors are part of a conductor loop, where a first primary conductor is provided as supply conductor and a second primary conductor as return conductor of the conductor loop. Supply conductor and return conductor are installed substantially parallel to each other and underneath the roller drive, perpendicular to the shaft axis.

Preferably, ferrite core 6 together with the secondary winding is provided underneath shaft 1, i.e., within the spatial region facing the primary conductors, inside roller component 10. Better efficiency is achievable as a result. Furthermore, metallic objects are conveyable on the side of the roller drive facing away from the primary conductors, which objects thus have only a negligible effect on the magnetic flux, and thus also the efficiency.

Roller component 10 is preferably made of plastic, which prevents eddy currents in the roller component and thus increases the efficiency.

Electronic circuit 9 includes a rectifier, which uses the alternating current applied via the secondary coil having a capacitance that is applied in parallel or in series, to generate a unipolar voltage, especially a direct voltage, from which an inverter is supplied. The inverter includes three half-bridges, each of which is made up of two electronic semiconductor power switches connected in series, such as IGBT, MOSFET or the like. The control of the switches is implemented in pulse-width-modulated manner. The switches of the half-bridges are controlled in alternation, such that a rotating magnetic field is able to be generated, by which the engine speed of the motor is controlled.

FIG. 1 also shows supply conductor 13 and return conductor 14 of the primary conductor system, which are surrounded by a ferrite core 15 on their side facing away from the roller drive.

In further exemplary embodiments, a quadripole is disposed between the secondary coil having the associated capacitance and the rectifier, the quadripole being a passive quadripole, connected on the input side to the current source formed by the secondary coil and the capacitance, and exhibits a voltage-source-type behavior on the output side. The quadripole is basically implementable as inverse gyrator. As an alternative, however, an active voltage adapter is also able to be integrated in electronic circuit 9, but this is more complex.

In further exemplary developments, an rpm sensor is provided in addition, so that the rotational speed of the roller is able to be controlled to a desired setpoint value.

In further exemplary embodiments, a higher frequency current component is modulated upon the primary conductor and demodulated on the secondary winding, or vice versa. Thus, not only is a contactless energy transmission possible, but also a contactless data exchange between electronic circuit 9 and a central computer disposed in stationary manner with the primary conductors.

In further exemplary embodiments, ferrite core 6 and winding 5 are placed underneath the shaft in order to achieve a great clearance with respect to the goods to be transported on the upper side of the roller drive, which thus are substantially unable to produce any eddy current losses despite their metallic implementation. Furthermore, more room thus is provided in the interior of the roller drive, e.g., for a shield such as an aluminum sheet metal part or the like.

In further exemplary embodiments, a gear motor is provided instead of the electric motor. Thus, the roller component is driven by an output shaft of a gear, which is driven by an electric motor.

In further exemplary embodiments, the primary conductors are at least partially surrounded by a ferrite core on the side facing away from the roller. Thus, the field flux is concentrated even better, and the inductive coupling to the secondary winding is improved.

In further exemplary embodiments, the primary conductors are provided opposite an axial terminal region of the roller, including the roller component and housing component 8, and the roller has a conical design so that the distance between primary conductor and ferrite core 6 is adjustable by an axial displacement. In addition, the ferrite core is provided accordingly on the inner side of the axial terminal region of the roller component.

In further exemplary embodiments, secondary winding 5 is used as sensor coil, whereby an arrival of the object to be conveyed is able to be implemented. Toward this end, a preferably higher frequency current is injected into the secondary coil, and the change in inductance upon the arrival of an object to be conveyed, in the sensitivity range of secondary winding 5 is detected by acquired current and voltage values. Once the arrival has been detected, the roller drive is activated, that is to say, the electric motor is started up. Since the electric motor is a synchronous motor, a highly dynamic startup operation is possible. In particular, the startup operation is executed prior to contact with the object to be conveyed. Instead of the secondary coil, a separate sensor coil is alternatively provided for detecting the arrival of the object to be conveyed.

The invention claimed is:

1. A roller drive, comprising:
   an electric motor;
   a roller component drivable by the electric motor;
   a secondary coil inductively coupleable to a primary conductor installed in an external environment of the roller component; and
   an electronic circuit connected to the secondary coil and adapted to supply the electric motor;
   wherein the electric motor, the electronic circuit, and the secondary coil are at least partially surrounded by the roller component to form a housing.

2. The roller drive according to claim 1, wherein the housing includes the roller component and additional housing components connected to the roller component, and wherein at least one of the housing components accommodates a bearing.

3. The roller drive according to claim 1, wherein a stator is connected to at least one of (a) a stationary axle and (b) a shaft of the roller drive.

4. The roller drive according to claim 1, wherein a rotor is fixedly connected to the roller component.

5. The roller drive according to claim 1, wherein the roller component is arranged between the secondary winding and the primary conductor.

6. The roller drive according to claim 1, wherein the secondary winding is arranged around a ferrite core, the ferrite core configured in an E-shape in a direction of the primary conductor.

7. The roller drive according to claim 1, wherein a distance between the roller drive and the primary conductor is adjustable by axial displacement of the roller drive.

8. The roller drive according to claim 7, wherein the roller drive includes a conical housing section.

9. The roller drive according to claim 1, wherein the roller component is made of plastic.

10. The roller drive according to claim 1, wherein the electronic circuit is connected to at least one of (a) a sensor and (b) a sensor coil winding.

11. The roller drive according to claim 10, wherein at least one of (a) the sensor and (b) the sensor coil winding is adapted to detect an arrival of a metallic part in a sensitivity range of at least one of (a) the sensor and (b) the sensor coil winding.

12. The roller drive according to claim 1, wherein the primary conductor is arranged perpendicular to at least one of (a) an axis and (b) a shaft of the roller drive.

13. The roller drive according to claim 1, wherein the primary conductor includes a supply conductor and a return conductor of a conductor loop arranged perpendicular to at least one of (a) an axis and (b) a shaft of the roller drive.

14. The roller drive according to claim 1, wherein at least one of (a) a medium-frequency current and (b) a current having a frequency between 10 and 500 kHz is injectable into the primary conductor, and a capacitance is connected to the secondary winding at least one of (a) in series and (b) in parallel, such that an associated resonant frequency substantially corresponds to a frequency of the current in the primary conductor.

15. The roller drive according to claim 1, wherein a higher frequency current component is provided for data transmission modulated upon a current in at least one of (a) the primary conductor and (b) the secondary winding.

16. The roller drive according to claim 1, wherein a rotor of the electric motor is adapted to drive an input shaft of a gear, the gear including an output shaft adapted to drive the roller component.

17. The roller drive according to claim 1, wherein further comprising at least one of (a) a magnetic shield and (b) an aluminum component arranged on a side of a ferrite core that faces away from the primary conductor, a secondary winding being wound around the ferrite core.

18. A system, comprising:
   a plurality of roller drives, each roller drive including:
      an electric motor;
      a roller component drivable by the electric motor;
      a secondary coil inductively coupleable to a primary conductor installed in an external environment of the roller component; and
      an electronic circuit connected to the secondary coil and adapted to supply the electric motor;
   wherein the electric motor, the electronic circuit, and the secondary coil are at least partially surrounded by the roller component to form a housing;
   wherein the plurality of roller drives inductively suppliable from a primary conductor system, the roller drives arranged one after another along the primary conductor system, at least one of (a) an alternating current and (b) an alternating current having a frequency between 10 and 500 kHz being injectable by a power supply, at least one of (a) a drive power, (b) a rotational speed, and (c) a torque of each roller drive being at least one of (a) controllable and (b) regulatable by the power supply at least one of (a) in the same manner and (b) in the same manner by current stipulation in the primary conductor system.

* * * * *